Sept. 30, 1947.                L. DEVAUX                    2,428,017
                         REMOTE CONTROL SYSTEM
                          Filed July 5, 1943              2 Sheets-Sheet 1
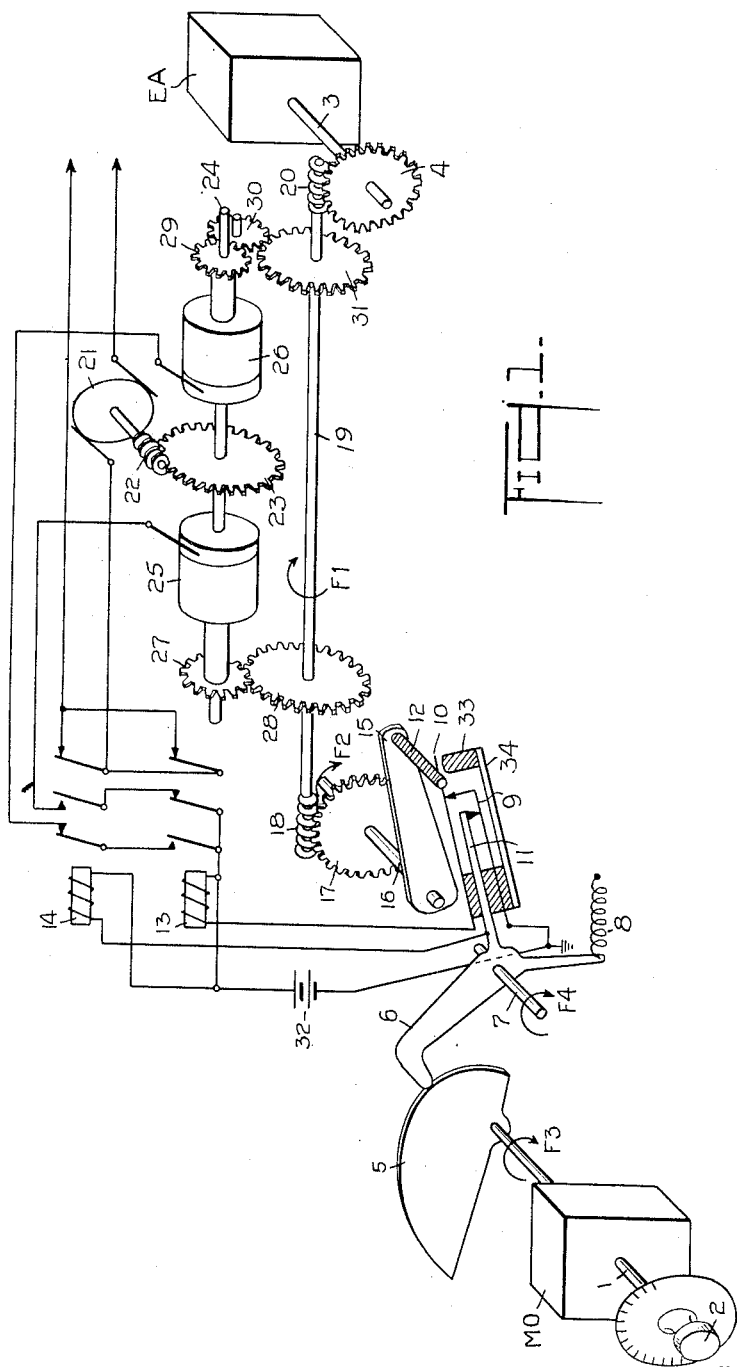
INVENTOR
LUCIEN DEVAUX
BY
Edward D. Kinney
AGENT.

Sept. 30, 1947. L. DEVAUX 2,428,017
REMOTE CONTROL SYSTEM
Filed July 5, 1943 2 Sheets-Sheet 2
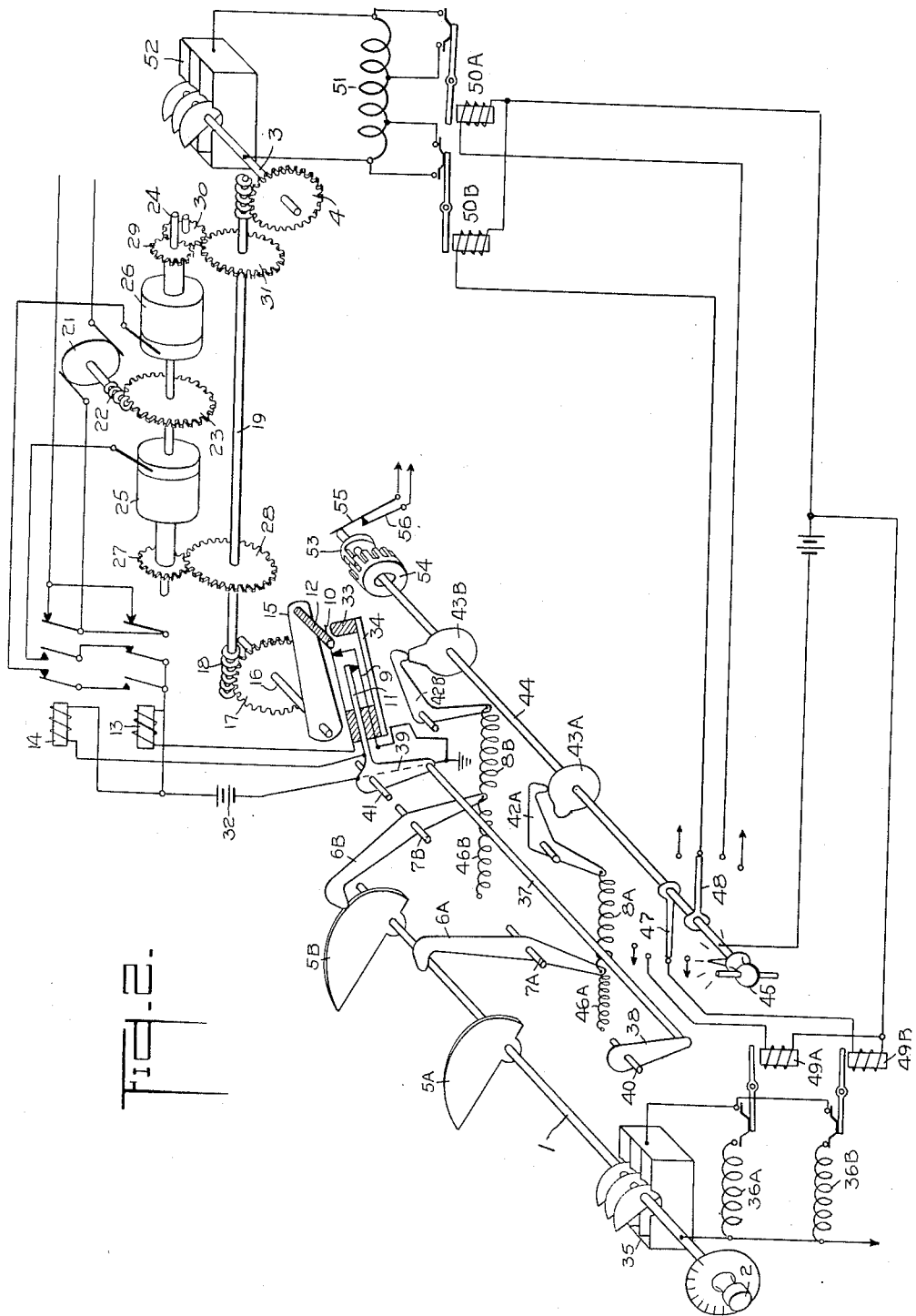
INVENTOR
LUCIEN DEVAUX
BY Edward P. Kinney
AGENT.

Patented Sept. 30, 1947

2,428,017

UNITED STATES PATENT OFFICE 2,428,017

REMOTE CONTROL SYSTEM

Lucien Devaux, Boulogne-Billancourt, France, assignor to International Standard Electric Corporation, New York, N. Y., a corporation of Delaware Application July 5, 1943, Serial No. 493,517
In France February 5, 1942

4 Claims. (Cl. 192—142)

The present invention relates to remote control systems in general and has reference in particular to such systems for automatic adjustment of radio transmitting stations.

In a radio transmitting station, the transmission frequency is determined by the master oscillator and the various amplification stages must be regulated so that their resonance frequency corresponds to that of the master oscillator. If it is desired to provide for variation of the transmission frequency, it is necessary to provide means for establishing a functional relationship between the tuned circuits of the amplifier and the frequency produced by the master oscillator. The latter frequency in turn depends upon the rotation of the variable condenser or of the vario-meter of the oscillating circuit. Generally, the condensers or vario-meters of various stages of amplification require unequal angles of rotation. When constructing such a transmitter for manual adjustment only, special means must be provided in order to take into account the special interdependence of these unequal angles of rotation. These special means may for instance be mechanical or electro-mechanical or of any other suitable type.

Briefly, I accomplish these and other objects as will become more apparent hereinafter, in the following manner:

The shaft of the condenser of the master oscillator carries a plurality of cams whose number corresponds to that of the amplification stages. Each of these cams embodies, for one stage, the particular functional relationship between the angular rotation of the condenser and the rotation of the shaft of the master oscillator. Followers arranged at the end of oscillating arms bear against the cam peripheries, in such manner that rotation of the shaft of the master oscillator produces a predetermined angular displacement of these arms. This predetermined displacement is produced by the particular shape of the cam, whereby the particular functional relationship between the angle of rotation of the master oscillator shaft and that of the condenser of the particular stage is given effect. The movement of each arm is used for individually controlling the rotation of the condenser of a particular stage. Adjustment is obtained by means of contact springs carried by each arm. These springs carry contacts which are interchangeably applied by an abutment element carried by an auxiliary arm. The movement of these springs depends upon the rotation of the shaft of the actuated condenser. The contacts serve to actuate a motor and to rotate, by means of clutches the shafts of the condensers in one direction or the other, until the same have been turned at such an angle that the abutment element acts upon the contact springs. As a result, a circuit is established stopping the rotation of the shafts and producing the desired adjustment.

The present invention is fully explained in the following description and illustrated by way of example in the accompanying drawings, in which—

Fig. 1 shows a simplified form of construction, and Fig. 2 shows schematically an example of a practical embodiment of the system according to the invention.

In Fig. 1 of the drawings, element MO designates the master oscillator whose condenser (not shown) is adjusted by means of shaft 1 which carries dial knob 2. Element EA represents a tuned circuit of the amplifier stage whose condenser (also not shown) is brought to the same frequency as the master oscillator MO by means of shaft 3 which is provided with a tangential gear 4.

The special mechanism will now be described which is used to co-relate shafts 1 and 3. When shaft 1 is put in a position which corresponds to the frequency at which the transmitter is intended to operate, the shaft 3 is turned until the frequency of element EA corresponds to that of master oscillator MO. For the sake of simplicity, a construction will first be described which comprises a master oscillator and but a single amplifying stage with a single range. It will be clear, however, that the principles of the present construction may be readily applied to a device comprising any number of stages with several ranges.

As shown in Fig. 1, shaft 1 carries a cam 5 whose shape is determined by the law of rotation of shaft 3. The type of contour required for cam 5 will be more fully explained hereafter.

The end of arm 6 presses against cam 5. Arm 6 is mounted on shaft 7 and is under the action of coil spring 8. Arm 6 is provided with two contact springs 9 and 10. The tension of these springs is such that in the absence of any outside action, spring 9 makes contact with blade 11 which is carried by arm 6, while spring 10 does not close any contact at all. When the abutment element 12, which will be further described hereafter, presses against spring 10, contact is established at a certain point between elements 9 and 10 and elements 9 and 11. There-after, abutment 12 continues to press against spring 10 and contact between elements 9 and 10 continues, whereas contact between elements 9 and 11 is interrupted. These contacts control relays 13 and 14 which in turn actuate motor 21 and the clutch elements associated therewith.

Arm 15 which supports abutment 12 is carried by shaft 16. The latter forms an exact continuation of shaft 7 in such manner that their geometrical axes coincide. Shaft 16 carries a tangential gear 17 which meshes with a worm 18 disposed at the end of shaft 19. At the other end of shaft 19, a second worm 20 is provided which meshes with tangential gear 4. The ratio of reduction between elements 17 and 18 on the one hand and elements 20 and 4 on the other hand, is such that, when shaft 3 travels through the maximum angle which it can traverse (generally a half revolution in the case of a variable condenser), the abutment 12 swings about shaft 16 through an angle equal to the maximum angle traversed by arm 6 under the influence of cam 5 when the latter is at maximum eccentricity.

If, after arm 6 has been brought into an angular position determined by the rotation of shaft 1, abutment 12 bears against spring 10, owing to rotation of shaft 19, in such manner that contacts 9, 11 and 9, 10 are closed simultaneously. The angular position of shaft 19 is thus determined with great precision. Moreover, the angular position of shaft 3 itself is determined with an accuracy dependent only upon the play in the gears and bearings. This play can be rendered negligible by proper construction. The contour of cam 5 is so shaped that, for each adjustment of oscillator MO, and for the corresponding adjustment of element EA, the arm 6 is brought into such position that abutment 12 produces simultaneously contact between elements 9, 11 and 9, 10. The contour of the cam can easily be graphically traced, by experiment, by marking the angular positions of shaft 3 in functional relationship to the rotation of shaft 1.

The automatic operation of control shaft 19 will now be described. Control shaft 19 is actuated, in one direction or the other, by motor 21 whose movement is transmitted by a reduction gear such as worm 22 and tangential gear 23 to auxiliary shaft 24. Shaft 24 comprises two clutches such as magnetic clutches 25 and 26. Clutch 25 serves to actuate the tooth wheel 27 which meshes with wheel 28 supported on shaft 19. When clutch 25 is actuated, shaft 19 revolves in direction of arrow F1 and shaft 16 revolves in the direction of arrow F2. Clutch 26 serves to actuate tooth wheel 29 which meshes with pinion 30. Wheel 31 on shaft 19 is turned by pinion 30 in opposite direction to arrow F1. As a result, depending upon whether clutch 25 or 26 is actuated, shaft 19 and with it shaft 16 and the variable condenser of EA are revolved in one direction or the other.

Clutches 25 and 26 are controlled by contacts of relays 13 and 14 which are fed by battery 32. These relays also serve for actuating motor 21.

The operation of the foregoing system is as follows:

Let us assume that the device is in rest position with the shaft of oscillator MO in a predetermined position. The contour of cam 5 is such that adjustment of unit EA is obtained when the end of arm 6, which bears against cam 5, causes abutment 12 to press against spring 10 so as to simultaneously close contacts 9, 10 and 9, 11. This result is obtained only in a particular position of the abutment.

Consequently, the position of the variable condenser of EA is adjusted with great precision. When the two relays 13 and 14 are excited, their armatures are moved out of rest position. As a result, the circuit of motor 21, which is normally closed over back contacts of the relays in series, is opened and neither one of clutches 25 and 26 is operated.

Now, in order to vary the frequency of the transmitter, the shaft 1 of the master oscillator MO is turned, for instance, in direction of arrow F3. The shape of the cam 5 is such that shaft 7 revolves in the direction of arrow F4. This will move the spring assembly away from abutment 12, and contact between 9, 10, is broken while contact 9, 11, remains closed. This will open the circuit of relay 13. Relay 14 remains energized over 9 and 11. The circuit of motor 21 is closed in the rest position of relay 13, and the motor is actuated. At the same time, the circuit of clutch 25 is closed from ground over the middle contacts of relays 14 and 13, and shaft 19 revolves in the direction of arrow F1. Shaft 16 revolves in the direction of arrow F2 and abutment 12 is rotated to bear against spring 10. When contacts 9, 10, are again closed, relay 13 operates and clutch 25 releases, whereupon shafts 19 and 16 are stopped. The motor 21 is stopped when relay 13 pulls up its armature.

Movement of shaft 19 is preferably very slow because there is no advantage in high speed. Stopping of the mechanism will therefore generally take place substantially instantaneously, provided of course that enough friction is applied. Nevertheless, a brake may be provided which will instantaneously stop the shaft as soon as the clutch releases. Such brake may be actuated by the closing of a contact associated with one of relays 13 and 14.

If, due to the speed acquired, shaft 16 overshoots the correct position, contact 9, 11, will be interrupted while contact 9, 10, is maintained. Relay 14 will be de-energized and relay 13 energized, and the clutch 26 is actuated by current flowing over armatures of relays 14 and 13. The shaft 19 revolves in the opposite direction, and the abutment 12 moved back into the desired position.

On the other hand, if shaft 1 is revolved in the opposite direction to arrow F3, shaft 7 will rotate in the opposite direction to arrow F4, but its movement will be quickly stopped by abutment 12 which presses spring 10 against stop 33 provided on arm 34. The latter forms part of the spring assembly and is carried by support 11. The end of arm 6 will cease to bear against cam 15. Contact 9, 11, is then open and contact 9, 10, closed, whereupon relay 14 is de-energized and 13 energized, in order to excite clutch 26. The shaft 16 revolves in the opposite direction to arrow F2. Shaft 7, under the influence of spring 8, follows shaft 16 until arm 6 again bears against cam 5. From this moment on, shaft 16 need continue its movement but for a short distance in order to disengage spring 10 from abutment 12, whereupon contacts 9, 10 and 9, 11, are re-established and the movement stops.

The foregoing description relates to a case in which a single amplification stage is automatically controlled by the master oscillator. This simplified description has been given merely for the purpose of facilitating the understanding of the invention. In practice, the transmitter always comprises several amplification stages and each stage may comprise several frequency ranges and these ranges may even be different from those of the master oscillator.

In the following will be considered the control of several amplification stages, each comprising a single range. The problem encountered in this connection is the same as in the system above-described. Each amplification stage comprises the same elements as above described. Shaft 24 and consequently motor 21 may be used in common for all the stages. All the cams 5 of the various stages are mounted on shaft 1. Each cam is connected to a control unit comprising arm 6 with its springs and a wheel 17 provided with abutment 12. The control units corresponding to the various stages are juxtaposed. The control units of the various stages operate independently of one another.

Generally speaking, the amplification stages comprise several ranges and these ranges may be different from one stage to the next and different from the ranges of the master oscillator. This holds true in the case of the embodiment of the present invention schematically illustrated in Fig. 2. This embodiment of the invention comprises a transmitter having a single amplification stage and being provided with but two ranges. The elements of the mechanism are the same as in the simplified embodiment above described and are repeated for each stage. Certain elements are repeated several times depending upon the number of ranges. In Figs. 1 and 2, like reference numerals have been used to designate like parts.

The master oscillator is represented by shaft 1 carrying control knob 2. Condenser 35 and a plurality of inductances such as 36A, 36B are provided in order to cover a plurality of ranges. Shaft 1 is provided with a plurality of cams 5A, 5B corresponding to the ranges.

Arms 6A, 6B are operatively co-related with the respective cams. These arms do not carry contact springs. The springs are rather supported by an auxiliary stirrup-shaped structure consisting of rod 37 and arms 38 and 39 attached to the two shafts 40, 41 whose geometrical axes coincide with the shafts 7A, 7B of arms 6A, 6B. Arm 39 supports the assembly comprising spring 11, abutment 33, and contact springs 9, 10. Rod 37 can be actuated by extensions of arm 6A, 6B.

The structure and function of abutment 12, which acts upon the springs, the control shaft 19, clutches 25, 26, motor 21, and the relays 13 and 14, etc., are exactly the same as those described in connection with Fig. 1.

Arms 6A, 6B are rotated counter-clockwise by springs 8A, 8B. However, only the spring 8 is tensioned which is on the arm which cooperates with the particular cam to be utilized. To this end, each spring 8A, 8B is attached to the end of a crank lever 42A, 42B whose other end bears against cam 43A, 43B. The latter are carried by shaft 44 provided with a control handle 45. Cams 43 serve to tension successively springs 8A and 8B according to the position of handle 45. When spring 8 of one of arms 6 is not tensioned, the arm is kept out of contact with its corresponding cam 5, by means of small springs 46A or 46B.

Shaft 44 serves for selecting the frequency range of both the master oscillator and the amplification stages. To this end, shaft 44 carries commutators 47, 48 which closes the circuits of switch elements 49A, 49B for the master oscillator and switch elements 50A, 50B for the amplification stage. As a result, inductances 36A or 36B of the master oscillator are placed in the circuit and a part of inductance for instance is short-circuited. Inductance 51 forms a resonant circuit with condenser 52 of the amplification stage.

In order to prevent interchange or short-circuiting of the inductances during operation of the transmitter, it is desirable that shaft 44 be locked when the transmitter is under tension, so that it cannot be operated by means of handle 45 until after the end of transmission. This object is readily obtained in the following manner:

Shaft 44 is provided with a lock bolt 53 which is adapted to engage the recesses of a fixed crown wheel 54 through whose center the shaft 44 extends. The latter is slidably arranged and under the pressure of spring 55 which tends to push lock bolt 53 into one of said recesses of wheel 54. In order to turn shaft 44 it is therefore necessary to first press upon handle 45 so as to counteract spring 55 and disengage the lock bolt 53. Movement of spring 55 breaks the contact of the latter with contact element 56 which is inserted in the connector circuit which latter serves to place the transmitter under voltage. Operation of the device is as follows:

In Fig. 2, shaft 44 is in position for using the range B. The elevated part of cam 45B acts upon crank lever 42B and spring 8B is tensioned, pressing arm 6B against cam 5B. Lever 42A bears against the lower portion of cam 43A and spring 46A moves arm 6A away so that same does not touch cam 5A. Commutator 47 closes the circuit of switch element 50B which actuates inductances 36B of the master oscillator while commutator 48 closes the circuit of switch element 50B, whereby a part of inductance 51 is short-circuited.

Arm 6B is thus actuated alone and it acts upon rod 37. The latter follows the movement of the arm and contacts 9, 10 and 9, 11 are thus rendered dependent upon the respective positions of this rod and abutment 12. The operation is exactly same as that of the simplified system described above.

Change from one range to the other is accomplished simply by turning shaft 44 by means of handle 45. The selected cam 5 is actuated by selection of the arm 6 and the inductances of the resonant circuits of the master oscillator and of the amplification stage are brought into the circuit.

Any number of frequency ranges may be provided for. To each range appertain a cam 5 and one contact on the commutators. Rod 37 has such length as may be necessary to accommodate all the arms 6 which, incidentally, may be closely adjacent to each other, so as to require a minimum of space.

The foregoing arrangement is repeated as often as there are amplification stages, whereby the motor 21 and shafts 24 and 44 may be used in common. Commutators 47 of the master oscillator and commutators 48 of the various stages are preferably grouped so as to form a single combination unit for controlling the switch elements of the various stages.

In a transmitter the different amplification stages may be separated by relatively great distances and, as a result, shafts 19 may become very long. In view of the great reduction obtained by means of the worms and tangential gears and in view of the fact that the adjustment of the resonance of the amplification circuits does permit a slight disagreement with respect to the theoretical position without appreciable loss of power, it is possible to shorten the shafts 19 by the use of Cardan joints or flexible joints in order to facilitate construction and eliminate the necessity of rigorous alignment of the bearings.

The cams corresponding to the various stages may be assembled upon several shafts connected to the principal shaft of the master oscillator by means of gear trains, compensation for play being provided for, if desired. The system described may be reversed, that is the cams may be placed on shafts associated with control elements and the follower arms may be arranged upon the shaft of the master oscillator.

It will be clear that the system described may be changed in many different ways without departing from the scope of the present invention. For instance, in the case of several frequency ranges it is possible to use a single arm 6 which may cooperate with several cams 5 by means of a sliding arrangement, or cams may be provided on the shaft of the master oscillator or the arm may be mounted on the axis thereof. Also, the clutches may be omitted and shaft 24 directly controlled by means of a reversible motor. The commutators and the electrical switch elements may be replaced by mechanical contact elements actuated by connecting rods whose movement would be obtained by means of cams mounted on shaft 44. Movement of the shaft of the master oscillator may be obtained directly by hand as described or by means of any kind of remote control device. Similarly, the control condensers may be replaced by vario-meters etc.

The control system according to the present invention, operating on the principle of a predetermined functional relationship and law, as described, may be applied to other uses besides regulation of radio transmitters without departing from the scope of the present invention; the point being, that each time the elements are brought automatically into a predetermined position given by the position of a master element and in accordance with the laws of interdependence between the positions of this master element and those of the controlled elements.

I claim:

1. In a remote control system, a first shaft, means for rotating it clockwise and counter-clockwise, a cam rotatable with said shaft, follower means engaging said cam and arranged to be variably operated by it, a set of contacts adapted to be variably operated under the control of said follower, a second shaft, an electric motor for rotating it in one direction or the other depending on the rotation of the first shaft, an arm controlled by said second shaft to cooperate with the contact set, a first relay having a circuit closed in response to one operation of the contact set by the follower, a second relay having a circuit closed in response to a different operation of the follower, and a circuit for the motor to rotate the second shaft in one direction or the other depending on which relay is energized, one of said relays being energized when the arm operates the contact set.

2. In a remote control system, a first shaft, means for rotating it clockwise and counter-clockwise, a cam rotatable with said shaft, a spring-pressed follower engaging said cam and arranged to be rocked about a pivot point under its control, a set of three normally closed contacts adapted to be rocked with respect to said pivot point by said follower, the first and the third contacts being opened when the set is rocked clockwise and the second and third contacts being opened when the set is rocked counter-clockwise, a second shaft, an electric motor, a first clutch for connecting said motor with the second shaft for rotating it clockwise and a second clutch for connecting the motor with the second shaft for rotating it counter-clockwise, an arm rotatable with said second shaft, an abutment carried by said arm in cooperative relationship with the contact set so as to close the first and third contacts and open the third and second contacts when the abutment is moved into engagement with the first contact, a first relay having a circuit including the first and third contacts, a second relay having a circuit including the second and third contacts, a circuit for the motor closed when either relay is de-energized, a circuit for the first clutch closed when the first relay is de-energized and the second relay energized, and a circuit for the second clutch closed when the first relay is energized and the second relay de-energized.

3. In a remote control system, a first shaft, means for rotating said first shaft clockwise and counter-clockwise, a set of contacts, means for variably operating said contacts upon rotation of said shaft in each direction, a second shaft, an electric motor for rotating said second shaft in one direction or the other depending upon the direction of rotation of the first shaft, an arm controlled by said second shaft to cooperate with the contact set, a first relay having a circuit closed in response to one operation of the contact set, a second relay having a circuit closed in response to a different operation of the contact set, and a circuit for the motor to rotate the second shaft in one direction or the other depending on which relay is energized, one of said relays being energized when the arm operates the contact set.

4. In a remote control system, a first shaft, means for rotating said first shaft clockwise and counter-clockwise, a cam rotatable with said shaft, follower means engaging said cam and arranged to be variably operated by it, a set of contacts adapted to be variably operated under the control of said follower, a second shaft, an electric motor for rotating said second shaft in one direction or the other depending upon the direction of rotation of said first shaft, an arm controlled by said second shaft to cooperate with the contact set, means responsive to one operation of the contact set by the follower for energizing the motor to rotate the said second shaft in one direction, means responsive to a different operation of the contact set by the follower for energizing the motor to rotate the second shaft in the opposite direction, one of said means being also responsive to operation of the contact set by the arm to energize said motor.

LUCIEN DEVAUX.

REFERENCES CITED

The following references are of record in the file of this patent:

UNITED STATES PATENTS

| Number | Name | Date |
| --- | --- | --- |
| 1,980,585 | Haberle et al. | Nov. 13, 1934 |
| 1,883,163 | Van Voorhis, Jr. | Oct. 18, 1932 |
| 1,727,575 | Trogner | Sept. 10, 1929 |
| 2,362,197 | Garrett | Nov. 7, 1944 |